(12) United States Patent
Sata et al.

(10) Patent No.: US 7,511,597 B2
(45) Date of Patent: Mar. 31, 2009

(54) ACTUATOR STRUCTURE AND ACTUATOR BLOCK ELECTRONIC DEVICE USING THE SAME

(75) Inventors: Norifumi Sata, Hyogo (JP); Takefumi Inoue, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/329,612

(22) Filed: Jan. 11, 2006

(65) Prior Publication Data

US 2006/0158290 A1 Jul. 20, 2006

(30) Foreign Application Priority Data

Jan. 14, 2005 (JP) ............... 2005-007387
Feb. 28, 2005 (JP) ............... 2005-052811

(51) Int. Cl.
*H01F 7/08* (2006.01)
(52) U.S. Cl. .............. 335/220; 335/221; 335/222; 335/223; 335/224; 335/225; 335/226; 335/227; 335/228; 335/229; 335/234; 335/236
(58) Field of Classification Search ......... 335/220–229, 335/234, 236
See application file for complete search history.

(56) References Cited

U.S. PATENT DOCUMENTS

| | | | | |
|---|---|---|---|---|
| 4,676,605 A | * | 6/1987 | Toda et al. ............... 359/696 |
| 5,013,223 A | * | 5/1991 | Takahashi et al. ........ 417/413.1 |
| 5,136,194 A | * | 8/1992 | Oudet et al. ............... 310/15 |
| 5,175,457 A | * | 12/1992 | Vincent ................... 310/15 |
| 5,182,481 A | * | 1/1993 | Sakamoto ................. 310/13 |
| 5,200,776 A | * | 4/1993 | Sakamoto ................. 396/86 |
| 5,559,378 A | * | 9/1996 | Oudet et al. ............... 310/17 |
| 6,236,125 B1 | * | 5/2001 | Oudet et al. ............... 310/12 |
| 6,420,949 B1 | * | 7/2002 | Umemoto et al. .......... 335/251 |
| 6,433,662 B1 | * | 8/2002 | Ikoma et al. ............... 335/256 |
| 6,561,144 B1 | * | 5/2003 | Muraji ................... 123/90.11 |
| 6,700,230 B1 | * | 3/2004 | Gokturk .................. 310/12 |
| 6,718,919 B2 | * | 4/2004 | Muraji ................... 123/90.11 |
| 6,859,122 B2 | * | 2/2005 | Divoux et al. ............. 335/78 |
| 6,873,239 B2 | * | 3/2005 | Decristofaro et al. ...... 336/178 |
| 6,933,827 B2 | * | 8/2005 | Takeuchi et al. .......... 336/212 |

(Continued)

FOREIGN PATENT DOCUMENTS

EP 1672774 A2 * 6/2006

(Continued)

OTHER PUBLICATIONS

European Search Report for corresponding European Application No. 06 25 0172.

*Primary Examiner*—Elvin G Enad
*Assistant Examiner*—Mohamad A Musleh
(74) *Attorney, Agent, or Firm*—RatnerPrestia

(57) ABSTRACT

The main body of the actuator structure is generally formed into a "pitchfork" shape. The middle bar of the pitchfork forms a Y-bend at its forward end. The Y-bend is disposed so that each tip of the bend is adjacent to the outer bar on each side of the pitchfork. At least a coil is fixed on each bar of the main body. The forward ends of the Y-bend abut against a movable member. In the structure above, applying a current to a coil generates minute movements in each tip of the Y-bend, thereby moving the movable member.

4 Claims, 4 Drawing Sheets

U.S. PATENT DOCUMENTS

| | | | |
|---|---|---|---|
| 6,967,550 B2 * | 11/2005 | Elendt et al. | 335/229 |
| 7,042,321 B2 * | 5/2006 | Walraet | 335/220 |
| 7,097,150 B2 * | 8/2006 | Sedda et al. | 251/129.16 |
| 7,113,351 B2 * | 9/2006 | Hovanky | 359/824 |
| 2002/0008602 A1 * | 1/2002 | Kyouno et al. | 335/220 |
| 2002/0039060 A1 * | 4/2002 | Maruyama | 335/220 |
| 2004/0093718 A1 * | 5/2004 | Takeuchi et al. | 29/602.1 |
| 2004/0246082 A1 * | 12/2004 | Divoux et al. | 335/220 |
| 2005/0024175 A1 * | 2/2005 | Gray et al. | 335/220 |
| 2005/0099254 A1 * | 5/2005 | Ohnstein et al. | 335/220 |
| 2005/0186064 A1 * | 8/2005 | Nishimura | 414/935 |

FOREIGN PATENT DOCUMENTS

| | | |
|---|---|---|
| JP | 02-202347 | 8/1990 |
| JP | 07-171777 | 11/1995 |
| JP | 11-023941 | 1/1999 |
| JP | 2003-207708 | 7/2003 |
| JP | 2005-341785 | 12/2005 |
| WO | WO 03/060931 | 7/2003 |

* cited by examiner

ACTUATOR STRUCTURE AND ACTUATOR BLOCK ELECTRONIC DEVICE USING THE SAME

BACKGROUND OF THE INVENTION

1. Field of the Invention

The present invention relates to an actuator structure mounted on various types of electronic devices to form a movable section of the device, and also relates to an actuator block and an electronic device using the structure.

2. Background Art

Recently, as penetration of camera-equipped mobile phones increases, the needs for compact and high-performance components, such as a lens module, have been growing.

As a conventional structure of a lens module, combination of a spring and a voice coil has generally been employed. FIG. 6 shows a conventional structure of a lens module.

According to a conventional lens module, as shown in the section view of FIG. 6, support frame 5 for fixing lens 6 is disposed in a gap between magnet 2 and yoke 3. At the lower end of support frame 5, voice coil 4 is disposed. In addition, spring 7 is located between support frame 5 and yoke 3. Lens module 1 is thus formed.

An electric current is applied to voice coil 4 to produce upward electromagnetic force. Lens 6 fixed by support frame 5 moves to a position at which the electromagnetic force and a restoration force of spring 7 balance with each other.

For example, Japanese Patent Unexamined Publication No. 2003-207708 is a well-known prior art that relates to the present invention.

In the conventional lens module above, however, the actuator structure, which is formed of magnet 2, yoke 3, and voice coil 4, is disposed over the circumference of the cylindrical shape of the lens module. The arrangement has inevitably invited a bulky shape of the entire module, and accordingly, has required a device on which the module is mounted to have an area wide enough for accepting the module.

SUMMARY OF THE INVENTION

The actuator structure of the present invention contains a main body formed of two magnetic material-made bar-shaped sections; a coil disposed on at least any one of the bar-shaped sections; and a movable member made of magnetic material. The backside of the main body is fixed to a fixed member. The movable member is disposed so as to abut on the front side of either one of the bar-shaped sections. Through application of a current to the coil, a bar-shaped section having an abutment with the movable member generates minute movements, thereby moving the movable member.

An actuator block using the actuator structure of the present invention contains a magnetic material-made main section in which an upper bar, a middle bar, and a lower bar in a parallel arrangement are connected with a base, and a magnetic material-made movable member. One end of the middle bar forms Y-bend: an upper bend and a lower bend. The upper bar and the lower bar have an upper coil and a lower coil, respectively. Each end of the upper and lower bars opposite to the ends connected with the base, or each end of the upper bend and the lower bend abuts against the movable member. In such structured actuator block, through application of a current to the upper or the lower coil, the end having abutment against the movable member generates minute movements, thereby moving the movable member.

An electronic device of the present invention contains a moving section formed of an actuator structure in which a section to be a movable member can be disposed, with minimal space of a predetermined width, on a side of a driven member along the moving direction of the driven member. Such mounted actuator structure exerts a force on the movable member to move the driven member in the moving direction through the movable member.

According to the structure of the present invention, applying a current to a coil causes minute movements of a bar-shaped section having an abutment on a movable member, thereby moving the movable member. The actuator structure having no voice coil can therefore be compact, which contributes to a space-saved installation in an actuator block and an electronic device on which the actuator structure is to be mounted.

DETAILED DESCRIPTION OF THE INVENTION

Exemplary Embodiment

Figure 1:
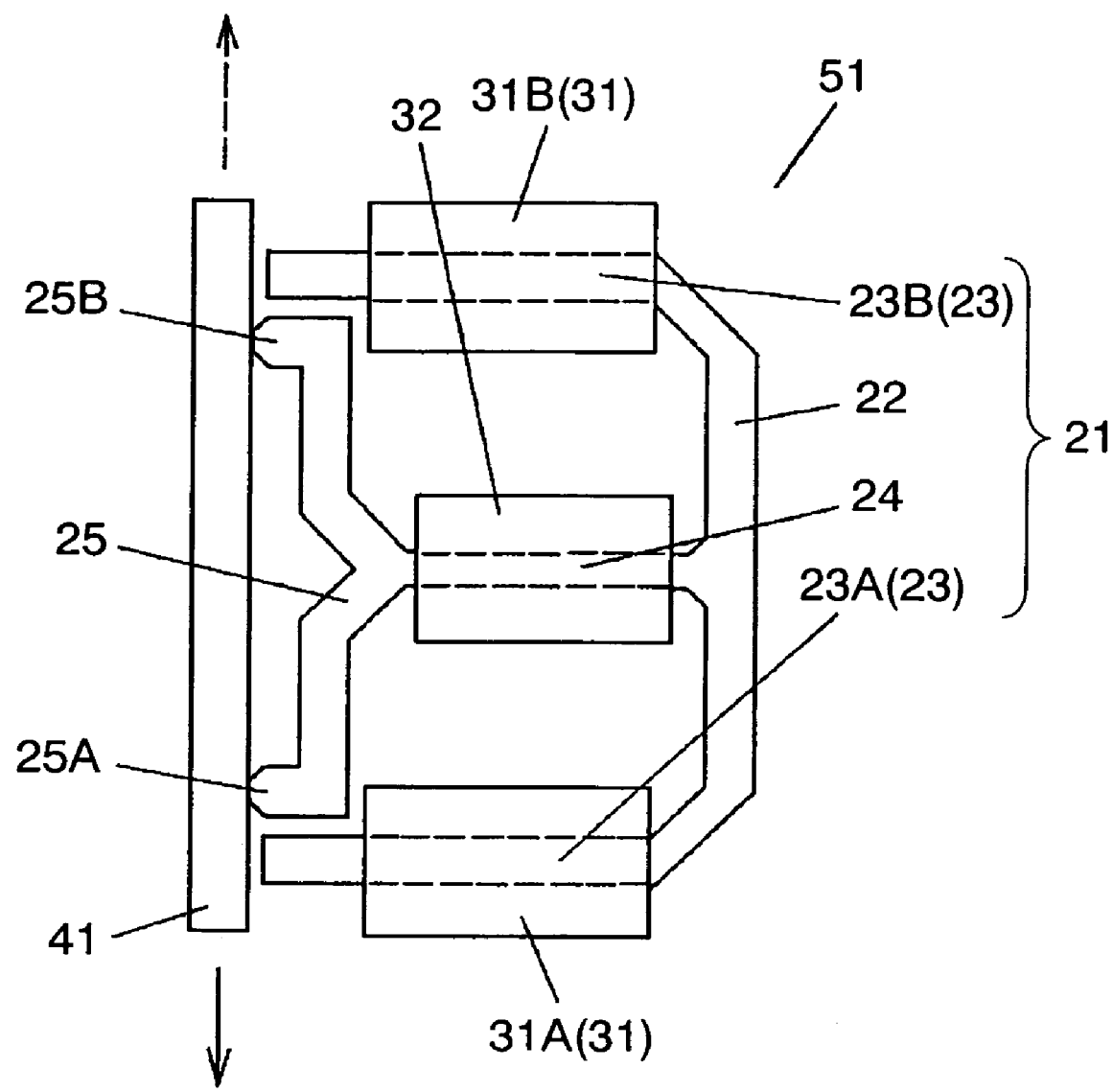
FIG. 1 is a side view of an actuator block that employs the actuator structure in accordance with an exemplary embodiment of the present invention.

FIG. 1 is a side view of an actuator block that employs the actuator structure in accordance with an exemplary embodiment of the present invention.

First will be described an actuator block using the actuator structure of the present invention with reference to FIG. 1. In FIG. 1, both ends of base 22 of main body 21 are formed into side bars 23: lower bar 23A and upper bar 23B disposed in parallel arrangement. In addition, middle bar 24 forwardly extends from a mid position of base 22 so as to be parallel with side bars 23. That is, main body 21 is formed into a "pitchfork". Base 22 is secured by a fixing member (not shown).

The forward end of middle bar 24 is formed into Y-bend 25 having lower bend 25A and upper bend 25B. Lower bend 25A and upper bend 25B are disposed adjacent to lower bar 23A and upper bar 23B, respectively. Both ends of lower bend 25A and upper bend 25B are disposed so as to protrude slightly beyond the position of each end of side bars 23. The ends of lower bend 25A and upper bend 25B are processed into a tapered shape.

Main body 21 is made of material having magnetic permeability, such as iron. Each section described above can be separately formed and then connected so as to have the shape above.

Coil 31 is fixed on side bars 23-lower coil 31A for lower bar 23A, and upper coil 31B for upper bar 23B; and similarly, middle coil 32 is fixed on middle bar 24.

Plate-like movable member 41, which is made of material with magnetic permeability, such as iron, is disposed in front of main body 21. Movable member 41 is urged toward main body 21 by a spring or elastic member (not shown). Each end of lower bend 25A and upper bend 25B abuts on the surface of movable member 41.

On the other hand, each end of lower bar 23A and upper 23B confronts the surface of movable member 41, with a slight gap kept therebetween.

Movable member 41 is slidably disposed in the lengthwise direction of the arrangement having lower bar 23A, lower bend 25A, upper bend 25B, and upper bar 23B, i.e., in the direction indicated by arrows in FIG. 1. Actuator block 51 is thus formed.

Now will be described how actuator block 51 works. First, a predetermined amount of current is applied to lower coil 31A and middle coil 32 to magnetize lower bar 23A and middle bar 24. This generates a magnetic loop through lower bar 23A base 22, middle bar 24, lower bend 25A, movable member 41, and lower bar 23A, so that movable member 41 is attracted to lower bend 25A and lower bar 23A. At this time, minute downward movements are generated in lower bend 25A, and due to the movements, a component of the downward (seen in FIG. 1) force is applied to movable member 41. As a result, movable 41 slightly moves downward as is indicated by the solid-line arrow in FIG. 1. Upon stopping the application of current to lower coil 31A and middle coil 32, lower bend 25A slides on movable member 41 and gets back to the state before the application of current. On the other hand, movable member 41 stays at a position lowered by a predetermined amount from the originally placed position. Employing movable member 41 having a polished surface facing middle bar 24 encourages a smooth movement of movable member 41 because of reduced friction between sliding middle bar 24 and the surface of movable member 41. As applying a current to the coils and stopping the application are repeated with a predetermined short period, movable member 41 gradually moves downward.

Next, a predetermined amount of current is applied to upper coil 31B and middle coil 32 to magnetize upper bar 23B and middle bar 24. This generates a magnetic loop through upper bar 23B, base 22, middle bar 24, upper bend 25B, movable member 41, and upper bar 23B, so that movable member 41 is attracted to upper bend 25B and upper bar 23B. At this time, minute upward movements are generated in upper bend 25B, and due to the movements, a component of the upward (seen in FIG. 1) force is applied to movable member 41. As a result, movable 41 slightly moves upward as is indicated by the dotted-line arrow in FIG. 1. Upon stopping the application of current to upper coil 31B and middle coil 32, upper bend 25B slides on movable member 41 and gets back to the state before the application of current. On the other hand, movable member 41 stays at a position raised by a predetermined amount from the originally placed position. As applying a current to the coils and stopping the application are repeated with a predetermined short period, movable member 41 gradually moves upward.

As described above, actuator block 51 using the actuator structure of the present invention allows plate-like movable member 41 to have upward and downward movements in the direction of arrangement of lower bar 23A, lower bend 25A, upper bend 25B, and upper bar 23B. Besides, the structure can contribute to a downsized whole structure than before, because the structure does not use a voice coil.

Actuator block 51 described in the embodiment can move movable member 41 in both of upward and downward direction. The embodiment describes the structure of actuator block 51. However, the structure does not necessarily require two actuator structures; the lower-half or the upper-half structure is enough for moving movable member 41 in one way direction. In that case, the required number of coils is at least one.

The structure having middle coil 32 as described in the embodiment can offer further advantages. For example, applying a current to coils including middle coil 32 strengthens the magnetic force in main body 21, thereby increasing the amount of movement of movable member 41. It is also possible to apply a current in a manner that the magnetic forces generated in the two actuator structures are cancelled out with each other. Furthermore, combining the application above can differently control the movement of movable member 41.

Although the embodiment describes the structure of actuator block 51 in which Y-bend 25 of middle bar 24 abuts against movable member 41, it is not limited thereto. The actuator block may have the structure in which the forward ends of side bars 23, i.e., the ends of lower bar 23A and upper bar 23B make contact with movable member 41 in a manner that the ends of side bars 23 are disposed forward beyond each end of Y-bend 25.

When main body 21 and movable member 41 are made of soft magnetic material, movable member 41 can keep smooth movements over the long term. The wording "soft magnetic material" here means materials having high magnetic permeability and low coercivity.

Although the embodiment introduces the structure in which movable member 41 is urged toward main body 21 by an urging member from the rear side, it is not limited thereto; employing a slightly magnetized material for the movable member, or mounting a permanent magnet on main body 21 so as to slightly magnetize main body 21 itself generates an attraction force between main body 21 and movable member 41, thereby eliminating the urging member for movable member 41. Through the attraction force, movable member 41 maintains its position after having movement. The wording "slightly magnetized material" here means materials having a magnetic flux smaller than that obtained by application of current to the coil 31 or 32. Also, the wording "so as to slightly magnetize main body 21 itself" here means that magnetized main body 21 has a magnetic flux smaller than that obtained by application of current to the coil 31 or 32.

Besides, main body 21 is not necessarily formed into the shape above. For example, each of side bars 23 and middle bar 24 can be produced as a separate bar-shaped member and fixed to a fixing member so that a loop of magnetic flux of an electromagnet is generated via the fixing member. Main body 21 may contain two middle bars each of which independently corresponds to lower bar 23A and upper bar 23B.

Next will be described a lens module as an example of the actuator structure of the present invention that serves as a moving section of an electronic device.

Figure 2:
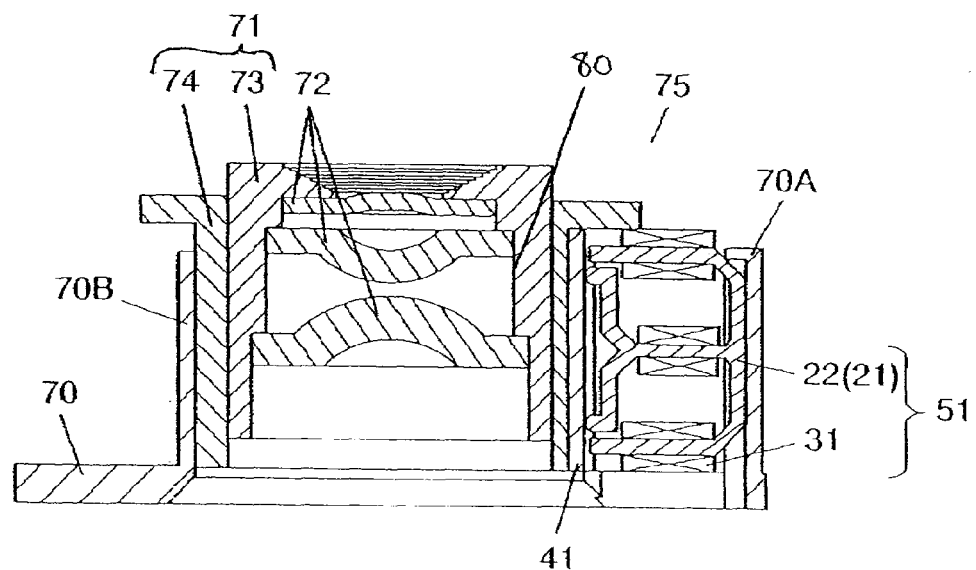
FIG. 2 is a section view of a lens module using the actuator structure as a moving part of an electronic device in accordance with the exemplary embodiment of the present invention.
Figure 3:
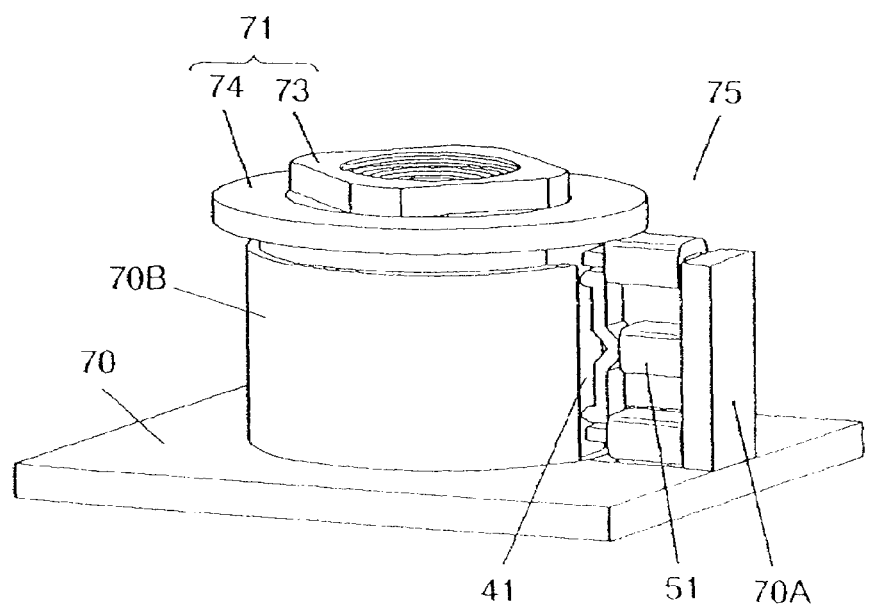
FIG. 3 is an external perspective view of the lens module using the actuator structure as a moving part of an electronic device in accordance with the exemplary embodiment of the present invention.
Figure 4:
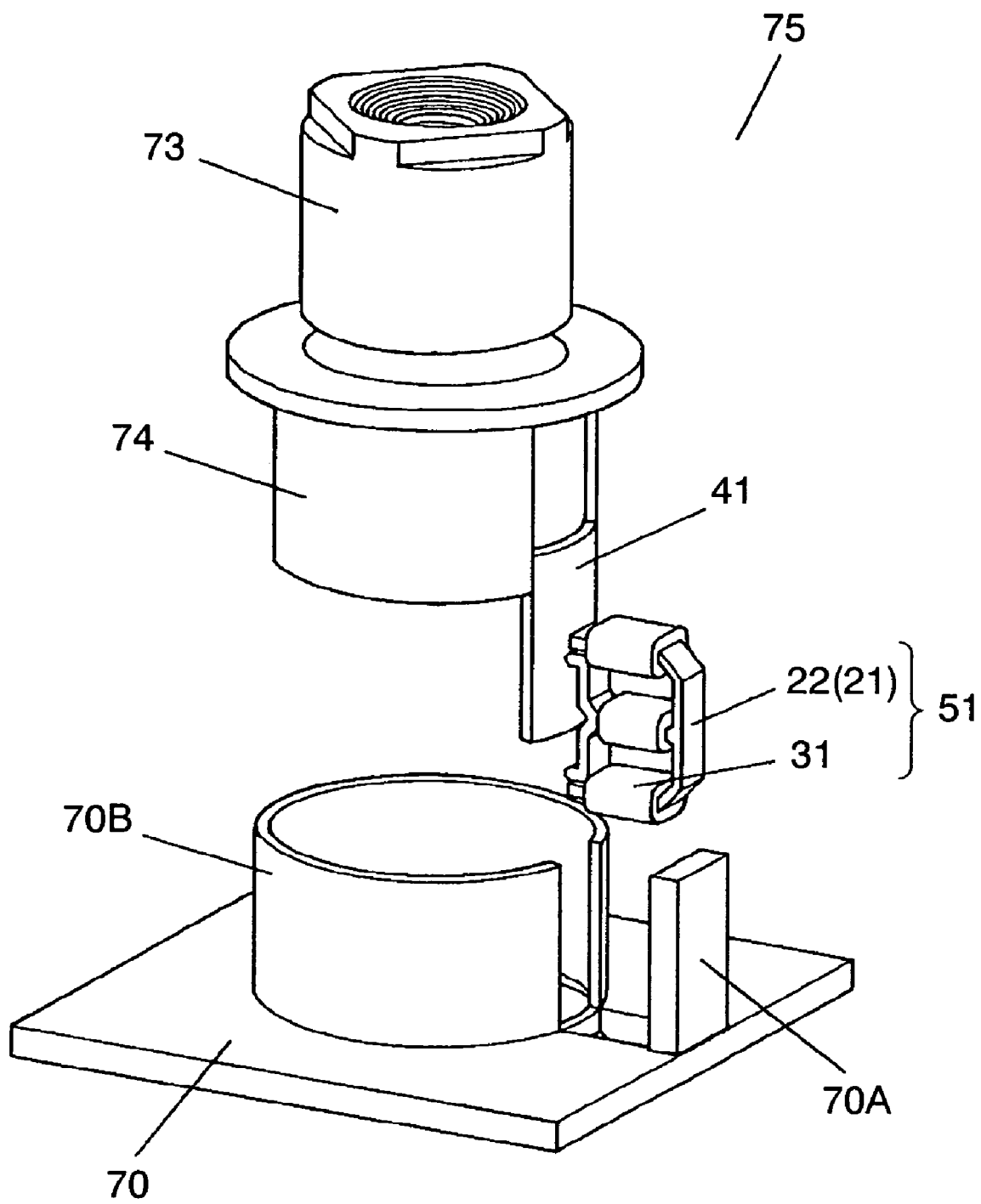
FIG. 4 is an exploded perspective view of the lens module using the actuator structure as a moving part of an electronic device in accordance with the exemplary embodiment of the present invention.

FIG. 2 is a section view of a lens module using the actuator structure as a moving part of an electronic device of the present invention. FIG. 3 is an external perspective view of the lens module. FIG. 4 is an exploded perspective view of the lens module. First member 71 contains outer cylinder 74 and inner cylinder 73. Lens object 72 is fixed in channel 80 formed in first member 71. Outer cylinder 74 is disposed in cylindrical section 70B of housing 70 so as not to be rotatable, but movable in a direction axially of outer cylinder 74. Cylindrical section 70B has an axial notch in which movable member 41 is fitted. Such structured first member 71 serves as a driven member.

The structure above contains an image sensor (not shown) at a position under lens 72 in housing 70.

Movable member 41 is fixed on the outer surface of outer cylinder 74 so as to be formed in a predetermined width in a direction axially of outer cylinder 74. Movable member 41 is made of material that is slightly magnetized. The outer surface of movable member 41 is exposed to the outside at notch of cylindrical section 70B.

Actuator block 51 described above is located so as to correspond to movable member 41. Base 22 of main body 21 is properly positioned by fixing projection 70A of housing 70 as a fixed member.

The positional relationship between actuator block 51 and movable member 41 is described above and therefore in-detail explanation thereof will be omitted. By virtue of a compact structure without a voice coil, actuator block 51 can be installed in a small area in the outer surface of outer cylinder 74. That is, the compact structure of actuator block 51 contributes to decrease in the installation area in a device that employs actuator block 51. Lens module 75 is thus structured.

With application of current to coil 31 of actuator block 51, movable member 41 moves by an amount in a direction axially of outer cylinder 74, and accordingly, outer cylinder 74 moves in the axial direction. As outer cylinder 74 moves, the distance between lens 72 in inner cylinder 73 and the image sensor varies, so that focusing is obtained.

Figure 5:
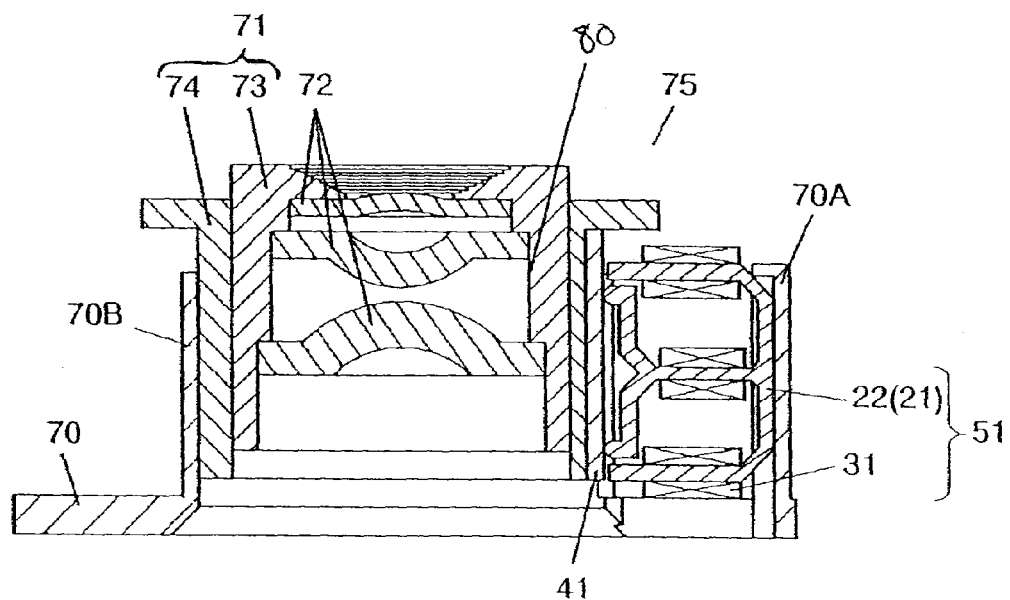
FIG. 5 is a section view of the lens module using the actuator structure as a moving part of an electronic device, with a lens unit as the essential part of the module moved upward, in accordance with the exemplary embodiment of the present invention.
Figure 6:
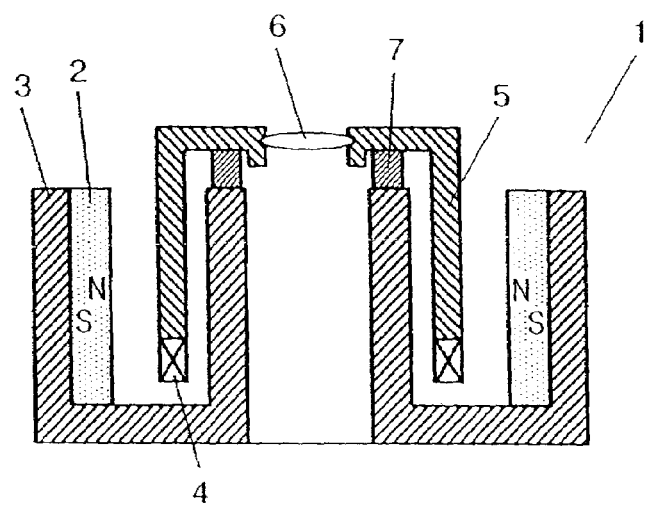
FIG. 6 is a section view of a conventional lens module.

FIG. 5 is a section view of the lens module as a moving part of an electronic device using the actuator structure, with a lens unit as the essential part of the module moved upward, in accordance with the embodiment of the present invention. FIG. 5 shows the state in which outer cylinder 74, i.e., first member 71 is moved upward from the state shown in FIG. 2. Outer cylinder 74 stays at a position after movement. The structure above allows outer cylinder 74 to further move upward or downward from the current stay position without returning the original position, thereby providing lens 72 with quick and effective positional control.

Lens module 75 employing the actuator structure of the present invention as a moving part of an electronic device, as described above, has a space-saver structure, contributing to a compact and lightweight device.

Lens module 75 has a modification in which movable member 41 is made of material that is not magnetized and the actuator structure moves movable member 41 upward only. With the structure above, the lens module can be structured so that lens unit 71 is moved upward as necessary by application of a current to the actuator structure, and upon stopping the application of current to coil 31 and the like, movable member 41 goes back to a reference position without staying at a position.

As another possible modification, the structure is formed of coaxially combined plurality of lens modules 75 to achieve zooming functions. Even in the combined use, the compact structure can neatly fit in a limited space.

It is to be understood that the structure is not limited to a lens module but widely employed for movable parts of various electronic devices and components.

According to the structure of the present invention, applying a current to a coil causes minute movements of a bar-shaped section having an abutment on a movable member, thereby moving the movable member. The actuator structure can therefore be compact, which contributes to a space saved installation in an actuator block and an electronic device on which the actuator structure is to be mounted. It is thus suitable for forming a movable part of electronic devices.

What is claimed is:

1. An electronic device employing an actuator structure comprising a lens barrel; a lens disposed in the lens barrel:
   a main body having an upper bar, a middle bar, and a lower bar that are made of magnetic material and is slidable along a periphery of the lens barrel so as to move the lens along with the movable member and disposed in parallel and having a base that is made of magnetic material and disposed to connect the upper bar, the middle bar, and the lower bar; and
   a movable member made of magnetic material,
   an end of the middle bar is formed into an upper bend and a lower bend, the upper and lower bends being L-shaped portions and each having one edge connected to the middle bar and an other edge touching the movable member,
   the upper bar, the middle bar and the lower bar have an upper coil, a middle coil and a lower coil, respectively,
   the main body, including the upper, middle and lower coils, is configured to move the movable member when a current is applied to at least two of the upper coil, the middle coil and the lower coil.

2. The electronic device of claim 1 wherein the movable member is made of soft magnetic material and is urged toward the main body.

3. The electronic device of claim 1 wherein the main body and the movable member are made of soft magnetic material.

4. The electronic device of claim 1 wherein the movable member has a polished surface in a side of the main body.

\* \* \* \* \*

UNITED STATES PATENT AND TRADEMARK OFFICE
CERTIFICATE OF CORRECTION

| | | |
|---|---|---|
| PATENT NO. | : 7,511,597 B2 | Page 1 of 1 |
| APPLICATION NO. | : 11/329612 | |
| DATED | : March 31, 2009 | |
| INVENTOR(S) | : Norifumi Sata et al. | |

It is certified that error appears in the above-identified patent and that said Letters Patent is hereby corrected as shown below:

On The Title Page

At item (54), "BLOCK ELECTRONIC" should read -- BLOCK AND ELECTRONIC --.

Signed and Sealed this

Twenty-first Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,511,597 B2 | Page 1 of 1 |
| APPLICATION NO. | : 11/329612 | |
| DATED | : March 31, 2009 | |
| INVENTOR(S) | : Norifumi Sata et al. | |

It is certified that error appears in the above-identified patent and that said Letters Patent is hereby corrected as shown below:

<u>On The Title Page, Item (54) and Column 1, line 2,</u>

"BLOCK ELECTRONIC" should read -- BLOCK AND ELECTRONIC --.

This certificate supersedes the Certificate of Correction issued July 21, 2009.

Signed and Sealed this

Eighteenth Day of August, 2009

David J. Kappos
*Director of the United States Patent and Trademark Office*